(12) United States Patent
Hoyne et al.

(10) Patent No.: US 10,110,484 B2
(45) Date of Patent: Oct. 23, 2018

(54) SYSTEM FOR CONSTRUCTING PATH-BASED DATABASE STRUCTURE

(71) Applicant: Google Inc., Mountain View, CA (US)

(72) Inventors: Neil Hoyne, Mountain View, CA (US); Rachel Zibelman, Mountain View, CA (US)

(73) Assignee: Google LLC, Mountain View, CA (US)

( * ) Notice: Subject to any disclaimer, the term of this patent is extended or adjusted under 35 U.S.C. 154(b) by 130 days.

(21) Appl. No.: 15/376,480

(22) Filed: Dec. 12, 2016

(65) Prior Publication Data

US 2018/0167317 A1    Jun. 14, 2018

(51) Int. Cl.
*G06F 15/173* (2006.01)
*H04L 12/721* (2013.01)
*H04L 12/26* (2006.01)
*H04L 12/751* (2013.01)

(52) U.S. Cl.
CPC ............ *H04L 45/70* (2013.01); *H04L 43/106* (2013.01); *H04L 43/16* (2013.01); *H04L 45/02* (2013.01)

(58) Field of Classification Search
CPC ....... H04L 45/70; H04L 43/106; H04L 45/02; H04L 43/16
See application file for complete search history.

(56) References Cited

U.S. PATENT DOCUMENTS

| 2002/0123923 | A1 | 9/2002 | Manganaris et al. |
| 2011/0106584 | A1 | 5/2011 | Borthwick et al. |
| 2014/0200968 | A1 | 7/2014 | Yoder et al. |
| 2014/0207560 | A1 | 7/2014 | Dandekar et al. |
| 2014/0222511 | A1 | 8/2014 | Broady et al. |

*Primary Examiner* — Benjamin M Thieu
(74) *Attorney, Agent, or Firm* — Foley & Lardner LLP (57) ABSTRACT

Systems, methods, and computer-readable storage media that may be used to generate a competitive metric are provided. One method includes receiving interaction data elements including identifiers and time stamps and generating a path data structure. A path data structure includes the interaction data elements sorted by identifier and time stamp. Further, the method includes sorting, parsing, and filtering the path data structure to generate a minor path data set. The method includes generating the competitive metric by using the minor path data set to determine the number of interactions an entity has with a group of content providers and comparing that number of interactions to the number of interactions a second entity has with the same group of content providers.

20 Claims, 5 Drawing Sheets

SYSTEM FOR CONSTRUCTING PATH-BASED DATABASE STRUCTURE

BACKGROUND

Content providers can identify how a user interacts with their resources, content items, and any other property owned by the content provider. Users may click on links associated with the content provider, interact with content items associated with the content provider, and interact with any other resource of the content provider. The content provider can make determinations about the user by analyzing the interaction data associated the owned and operated properties of the content provider. If the content provider wants to know how a user interacts with another content provider, the content provider may rely on user polling and other conventional methods.

SUMMARY

One illustrative implementation of the disclosure relates to a method that includes receiving, at a computerized analysis system, a plurality of interaction data elements. Each of the plurality of interaction data elements is associated with a resource of a content provider and includes an identifier and a time stamp. The method further includes generating, at the computerized analysis system, a path data structure comprising a plurality of paths, each of the paths representing a series of interactions. The path data structure is generated by: (1) correlating identifiers of the plurality of interaction data elements to determine a set of interaction data elements corresponding to a particular entity identified by the identifier and (2) generating the path data structure by linking the interaction data elements of the set according to time based on the associated time stamps. The method further includes generating a minor path data set by: (1) parsing, at the computerized analysis system, the path data structure to generate a major path data set comprising paths having interaction data elements associated with time stamps within a predefined period of time and identifiers associated with a first entity and (2) filtering, at the computerized analysis system, the major path data set to generate the minor path data set based on a network model and content providers associated with the resources. The method further includes determining, at the computerized analysis system, a competitive metric for the minor path data set to be provided to a first content provider by: (1) querying the minor path data set to determine a first number of interaction data elements identifying the first entity and the resources associated with a plurality of second content providers different from the first content provider, (2) determining, from the path data structure, a second number of interaction data elements identifying an entity other than the first entity and the resources associated with the second content providers, and (3) determining the competitive metric based on a comparison of the first number of interaction data elements with the second number of interaction data elements.

Another implementation relates to a system including at least one computing device operably coupled to at least one memory and configured to receive a plurality of interaction data elements. Each of the plurality of interaction data elements is associated with a resource of a content provider and include an identifier and a time stamp. The at least one computing device is further configured to generate a path data structure comprising a plurality of paths by correlating identifiers of the plurality of interaction data elements and linking the correlated interaction data elements according to time based on the associated time stamps. The at least one computing device is further configured to generate a minor path data set by: (1) parsing the path data structure to generate a major path data set comprising the paths having interaction data elements associated with time stamps within a predefined period of time and identifiers associated with a first entity and (2) filtering the major path data set to generate the minor path data set based on a network model and content providers associated with the resources. The at least one computing device is further configured to determine a competitive metric for the minor path data set to be provided to a first content provider by: (1) query the minor path data set to determine a first number of interaction data elements identifying the first entity and the resources associated with a plurality of second content providers different from the first content provider, (2) determine, from the path data structure, a second number of interaction data elements identifying an entity other than the first entity and the resources associated with the second content providers, and (3) determine the competitive metric based on a comparison of the first number of interaction data elements with the second number of interaction data elements.

Yet another implementation relates to one or more non-transitory computer-readable storage media having instructions stored thereon that, when executed by at least one processor, cause the at least one processor to perform operations. The operations include receiving a plurality of interaction data elements. Each of the plurality of interaction data elements is associated with a resource of a content provider and include an identifier and a time stamp. The operations further include generating a path data structure comprising a plurality of paths by correlating identifiers of the plurality of interaction data elements and linking the correlated interaction data elements according to time based on the associated time stamps. The operations further include generating a minor path data set by: (1) parsing the path data structure to generate a major path data set comprising the paths having interaction data elements associated with time stamps within a predefined period of time and identifiers associated with a first entity, and (2) filtering the major path data set to generate the minor path data set based on a network model and content providers associated with the resources. The operations further include determining a competitive metric for the minor path data set to be provided to a first content provider by: (1) querying the minor path data set to determine a first number of interaction data elements identifying the first entity and the resources associated with a plurality of second content providers different from the first content provider, (2) determining, from the paths, a second number of interaction data elements identifying an entity other than the first entity and the resources associated with the second content providers, (3) querying the minor path data set to determine a third number of interaction data elements identifying the first entity and resources associated with the first content provider, (4) comparing the third number of interaction data elements with the first number of interaction data elements to generate a first ratio, (5) determining, from the path data structure, a fourth number of interaction data elements identifying the entity other than the first entity and the resources associated with the first content provider, (6) comparing the fourth number of interaction data elements with the second number of interaction data elements to determine a second ratio, and (7) determining the competitive metric based on a comparison of the second ratio and the first ratio.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Referring generally to the Figures, various illustrative systems and methods are provided that may be used to generate a competitive metric. A competitive metric may indicate a propensity of a user to research a variety of different sources (e.g., different brands and/or product/service sources) prior to performing a conversion (e.g., making a purchase). A high competitive metric may indicate that a user is currently considering multiple brands (i.e., content providers). A low competitive metric may indicate that the user is only considering a single brand (i.e., content provider) or is brand loyal.

Generating a competitive metric from network activity may prove difficult for an analysis system and may require extensive processing time (i.e., a number of processing cycles of a processor above a predefined threshold). Certain sorting, parsing, and grouping mechanisms can be utilized by the analysis system to lower the processing time (i.e., processing cycles of a processor) required to generate competitive metrics. Further, processing time can be lowered by using various data and/or metric sampling techniques. These techniques can be used to identify competitive metrics for a large population based on metrics or data associated with a sample population. This may allow the analysis system to generate the competitive metric more quickly (i.e., within a predefined amount of time).

To generate the competitive metric within the predefined amount of time, the analysis system can be configured to receive network activity of a user, form data path sets with the network activity, and generate the competitive metric based on the data paths sets. Based on time stamps and entity identifiers, the analysis system can parse and group the received network activity data to generate major path data. Once parsed and grouped, the major path data may include user paths of only one user occurring within a predefined amount of time (i.e., a window of time).

Based on the major path data, the analysis system can generate minor path data. The minor path data can be generated by filtering the major path data with a network model. This filtering may remove interactions with resources associated with content providers that are not associated with a certain subcategory. This may allow any unrelated resource interactions in the major path data to be removed. For example, if the major path data includes interactions with shoes related resources and automobile related resources but the content provider is only interested in the competitiveness of a user in the shoe market, the interactions with the automobile resources can be removed from the major path data via the network model. The network model can be one or more industry verticals or a model which identifies content providers that are competitors and/or various market subcategories in which the content providers are associated.

In some implementations, the analysis system can generate the competitive metric from the minor path data. The competitiveness metric can be generated based on a comparison of the number of interactions of one user with a first set of content providers to the number (i.e., average number) of interactions of a plurality of users with the first set of content providers. Further, a ratio of the number of interactions of the user between a set of second content providers and the first content provider can be compared to a ratio of the number of interactions of the plurality of users between the second content providers and the first content provider. This comparison of interactions and ratios helps in determining a level at which a user's behavior correlates to that of the user's peers and helps determine if a user is more or less competitive than the user's peers.

In some implementations, the analysis system can pre-process (i.e., sort, parse, filter, etc.) network activity (i.e., interaction data) in advance to a competitiveness metric request by a content provider in order to responded quickly to content provider requests. For example, a request for a competitiveness metric from a content provider server may include a priority level. The priority level may refer to how quickly the content provider wants to receive the competitive metric, the priority level can cause the analysis system operate within time constraints. In various implementations, the priority level may be based on user path complexity, the average number of bids assigned to a content position, a metric of content campaign effectiveness, a value (e.g., loyalty metric, a customer value metric, etc.) which the content provider assigns to the user associated with the request, and/or any other value or metric. If the priority level of the request is high (i.e., above a predefined threshold), a competitiveness metric may be determined from user path data that has already been retrieved, parsed, and sorted. In this regard, the competitiveness metric can be determined quickly. If the priority level of the request is low (i.e., below a predefined threshold), the method may include retrieving a second set of network activity data, parsing and sorting the data, and generating a second, update-to-date competitive metric.

By performing the various parsing, filtering, and sorting processes, the analysis system may generate the competitive metric with less processing cycles of various processors of the analysis system. For example, querying the minor set for a number of interactions with a content provider can be performed faster than querying the entire path data because the minor set is parsed and filtered based on market category and user. Also, parsing, filtering, and sorting the path data into a minor set allows the analysis system to make determinations regarding the entire path data quickly (i.e., with less processing cycles). As an illustration, the minor set may represent a single user's interactions with a select group of content providers within a predefined amount of time. Once the select group of content providers is determined by the analysis system from the minor path data, the path data can be queried for information in a more concise manner. For instance, the path data can be queried for interactions for the select group of content providers within the predefined time period rather than querying the entire path data for any content provider within a certain market subcategory since the minor set indicates each exact content provider from the select group of content providers to query the path data for.

Figure 1:
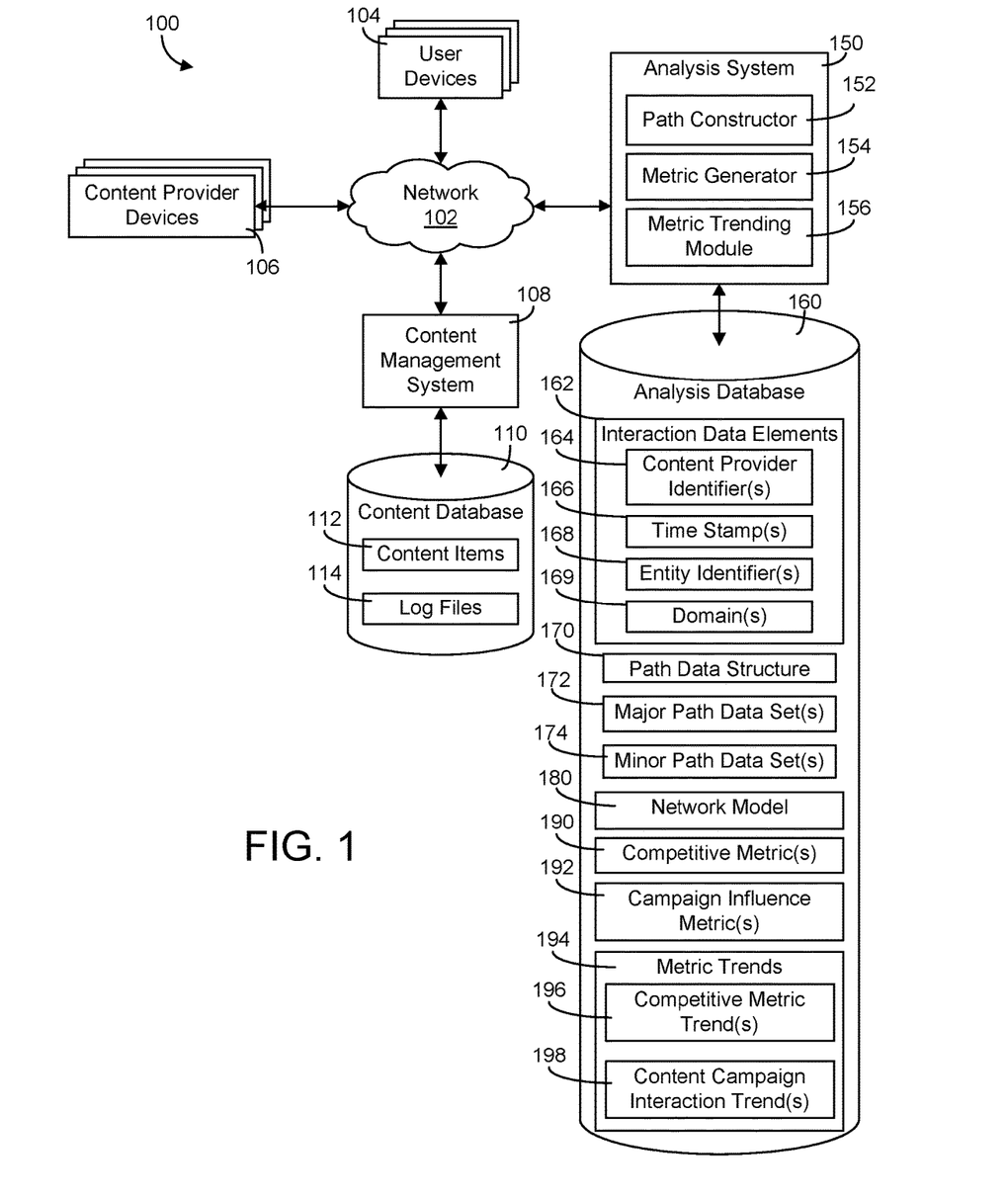
FIG. 1 is a block diagram of an analysis system and associated environment according to an illustrative implementation.

Referring now to FIG. 1, a block diagram of an analysis system 150 and associated environment 100 is shown according to an illustrative implementation. One or more user devices 104 may be used by a user to perform various actions and/or access various types of content, some of which may be provided over a network 102 (e.g., the Internet, LAN, WAN, etc.). A "user" or "entity" used herein may refer to an individual operating user devices 104, interacting with resources or content items via user devices 104, etc. User devices 104 may be used to access websites (e.g., using an internet browser), media files, and/or any other types of content. A content management system 108 may be configured to select content for display to users within resources (e.g., webpages, applications, etc.) and to provide content items 112 from a content database 110 to user devices 104 over network 102 for display within the resources. The content from which content management system 108 selects items may be provided by one or more content providers via network 102 using one or more content provider devices 106.

In some implementations, content management system 108 may select content items from content providers to be displayed on user devices 104. In such implementations, content management system 108 may determine content to be published in one or more content interfaces of resources (e.g., webpages, applications, etc.). Content management system 108 may be configured to conduct a content auction among third-party content providers to determine which third-party content is to be provided to user device 104. The auction winner may be determined based on bid amounts and a quality score (i.e., a measure of how likely the user of the user device 104 is to click on the content). In some implementations, content management system 108 allows content providers to create content campaigns. A campaign may include any number of parameters, such as a minimum and maximum bid amount, a target bid amount, or one or more budget amounts (e.g., a daily budget, a weekly budget, a total budget, etc.), a domain location (i.e., upper-funnel domain, middle-funnel domain, lower-funnel domain), and/or any other parameter.

Analysis system 150 may include one or more processors (e.g., any general purpose or special purpose processor), and may include and/or be operably coupled to one or more transitory and/or non-transitory storage mediums and/or memories (e.g., any computer-readable storage media, such as a magnetic storage, optical storage, flash storage, RAM, etc.). In various implementations, analysis system 150 and content management system 108 may be implemented as separate systems or integrated within a single system (e.g., content management system 108 may be configured to incorporate some or all of the functions/capabilities of analysis system 150).

Analysis system 150 may be communicably and operatively coupled to analysis database 160. Analysis system 150 can be configured to query analysis database 160 for information and store information in analysis database 160. In various implementations, analysis database 160 includes various transitory and/or non-transitory storage mediums. The storage mediums may include but are not limited to magnetic storage, optical storage, flash storage, RAM, etc. Database 160 and/or analysis system 150 may use various APIs to perform database functions (i.e., managing data stored in database 160). The APIs may be but are not limited to SQL, ODBC, JDBC, etc.

Analysis system 150 may be configured to receive information from network 102. The information may include browsing histories, cookie logs, online activity data and/or any other indication or interactions with an online resources that a user (i.e., user devices 104) may have on network 102. Analysis system 150 may be configured to receive and/or collect the interactions that user devices 104 have on network 102. This information may be stored as interaction data elements 162.

Analysis system 150 can be configured to send information and/or notifications relating to various metrics determined by analysis system 150 to content provider devices 106. This may allow a user of content provider devices 106 to review the various metrics which analysis system 150 determines. Further, analysis system 150 can use the various metrics to identify opportune times to make contact with a user. Analysis system 150 can cause a message to be sent to content management system 108 and/or content provider devices 106 indicating that the content management system 108 should make contact with a certain user at a certain time and/or a content campaign operate with certain parameters. This may cause content management system 108 to manage content auctions accordingly and/or identify various system loads.

Analysis system 150 may include one or more modules (i.e., computer-readable instructions executable by a processor) and/or circuits (i.e., ASICs, Processor Memory combinations, logic circuits, etc.) configured to perform various functions of analysis system 150. In some implementations, the modules may be or include path constructor 152, metric generator 154, and metric trending module 156. Analysis system 150 may be configured to construct path data with path constructor 152. In some implementations, path constructor 152 uses interaction data elements 162 to construct path data sets. The path data sets that path constructor 152 generates may be path data structure 170, major path data set(s) 172, and minor path data set(s) 174.

Interaction data elements 162 may represent various interactions an entity has with a resource, such as a website, a link, a search engine element, a content item, etc. Interaction data elements 162 is shown to include content provider identifier(s) 164, time stamp(s) 166, entity identifier(s) 168, and domain(s) 169. Content provider identifier(s) 164 can be various data identifiers associated with resource interactions that indicate a certain content provider. Time stamp(s) 166 may indicate a time at which a user (i.e., entity) interacts with the resource, content item, etc. Further, entity identifier(s) 168 may identify a user and/or device that interacts with the resource, content item, etc. Domain(s) 169 can be and/or include any kind of identifier that indicates what domain the interaction occurred on. Examples of domains may be search engines, webpages, etc.

Path constructor 152 may generate path data structure 170 with content provider identifier(s) 164, time stamp(s) 166, and/or entity identifier(s) 168. Path data structure 170 may be a list or other data structure containing interaction data elements 162 sorted by time stamp(s) 166 and/or entity identifier(s) 168. In some implementations, path data structure 170 may describe resource interactions that identify a web browsing journey from one resource or domain (i.e., domain(s) 169) to another. Path data structure 170 may include a plurality of paths, each path associated with a user or group of users based on the entity identifier(s) 168. In various implementations, path constructor 152 is configured to filter out various interaction data elements 162. In some implementations the interaction data elements filtered out are interactions with videos, interactions with display items, etc.

Path constructor 152 can be configured to generate major path data set(s) 172 and minor path data set(s) 174. In various implementations, major path data set(s) 172 can be filtered versions of path data structure 170. Path constructor 152 may be configured to filter path data structure 170 by entity identifier(s) 168, time stamp(s) 166, and/or a predefined period of time. This filtered version of path data structure 170 may be major path data set(s) 172. Each major path data set 172 of the plurality of major path data sets 172 may include resource interactions of a single entity (i.e., user) within a predefined amount of time.

Based on the major path data set(s) 172, path constructor 152 can generate minor path data set(s) 174. Path constructor 152 can be configured to filter out interactions based on content provider with network model 180. In some implementations, network model 180 is used by path constructor 152 to remove interactions with resources associated with content providers which do not include a common tag or identifier. In various implementations, network model 180 is used by path constructor 152 to remove interactions with resources associated with content providers that are not in a certain group and/or market category (i.e., a shoes category, an automobile category, etc.).

Based on the path data (i.e., path data structure 170, major path data set(s) 172, and/or minor path data set(s) 174) generated by path constructor 152, metric generator 154 can be configured to generate metrics for an entity (i.e., user). The metrics may include competitive metric(s) 190. The competitive metric(s) 190 may indicate how competitive a certain entity is in a specific market category. For example, a user with a high competitive metric may be a user that tends to consider a number of brands or sources for a particular type of purchase. A user with a low competitive metric may be a user that is brand loyal to a specific brand or tends not to research or consider multiple alternative brands, products and/or services before performing a conversion/making a purchase.

Metric generator 154 can be configured to generate campaign influence metric(s) 192. In some implementations, campaign influence metric(s) 192 can be generated to identify how influential a content campaign is on a user. A highly influential campaign may be one that causes or drives an entity towards performing a conversion (i.e., a purchase) and/or causes the competitive metric 190 associated with the entity to decrease. Metric generator 154 can be configured to generate campaign influence metric 192 based on metric trends 194. Metric trends 194 may include a trend in competitive metric 190 (e.g., competitive metric trend(s) 196) and a trend in content campaign interactions (e.g., content campaign interaction trend(s) 198). Content campaign interactions may indicate in what amount and how often a user (i.e., user devices 104) interacts with content items of a content campaign.

Metric trending module 156 can be configured to record and trend metrics over time and generate metric trends 194. Metric trends 194 can include a trend in competitive metric(s) 190 (i.e., competitive metric trend(s) 196). Further, metric trends 194 can include a trend of interactions with a content item and/or content campaign (i.e., content campaign interaction trend(s) 198). Metric trending module 156 can be configured to record competitive metrics 190 over time. In some implementations, the competitive metrics 190 are stored in competitive metric trend(s) 196. In various implementations, metric generator 154 can monitor the trend. By monitoring the trend, metric generator 154 can identify changes in the competitive metric. If the change in the metric is above a predefined threshold, metric trending module 156 can be configured to send a notification to content provider devices 106 and/or content management system 108. The notification may indicate that the competitive metric for a user has changed rapidly.

Based on path data structure 170 and/or interaction data elements 162, metric trending module 156 can record the number of interactions a user (i.e., entity) has with a particular content campaign over time. A content campaign may include a select group of content items and/or certain placement (i.e., on upper-funnel domains, on lower-funnel domains, etc.), various website selections, various price parameters and/or any other information or parameter. The content items associated with the content campaign may be selected by content management system 108 for a single user. In some implementations, the content items may be selected by content management system 108 for a group of users.

Network model 180 may be one or more models which groups content providers and/or interactions. In various implementations, network model 180 can be generated by analysis system 150. Analysis system 150 can generate the network model 180 based on common tags and/or identifiers of various content providers. Content provider devices 106 and/or user devices 104 may report a tag and/or identifier associated with content providers, content items (e.g., content items 112) and/or resources. For example, content providers, resources, and/or content items associated with shoes may be reported as having a shoes tag, a sporting goods tag, a fashion tag, and/or any other tag associated with the resource and/or content item. Further, analysis system 150 may identify tags for various content items and/or resources based on recurring keywords on the resources, domains, and/or content items associated with a content provider.

Network model 180 can be a competitor model. The competitor model may identify groups of content providers which may be competitive. One of content provider devices 106 can identify a custom group for network model 180. The custom group may allow analysis system 150 to generate a competitiveness model for a select group of content providers.

Still referring to FIG. 1, metric generator 154 can be configured to generate one or more competitive metric(s) 190. Metric generator 154 can be configured to receive an analysis request from one content provider via content provider device(s) 106 and/or content management system 108 for an entity. The content provider initiating the analysis request may be referred to as the first content provider herein. The entity identified by the analysis request may be referred to as the first entity herein. The analysis request may be a request to generate competitive metric 190. The first entity may be a user for which the content provider wants to generate competitive metric(s) 190. Further, the analysis request may include a select group of content providers to be used in generating competitive metric(s) 190. In some implementations, when no selection of content providers is provided by the first content provider, analysis system 150 may automatically use all known content providers and/or all known content providers within a specific group and/or category as can be identified by network model 180. The content providers, either automatically identified by analysis system 150 and/or identified by the first content provider, may be referred to as the second content providers herein.

The analysis request may include age parameters, location parameters, and/or any other entity parameter to be used in the request. The entity parameters may indicate a group of users that the requesting content provider wants to generate competitive metric 190 against. In various implementations, if no entity parameters are received, analysis system 150 may use all entities associated with entity identifier(s) that are stored in interaction data elements 162. This group of users may be known as the second entity herein.

Based on interaction data elements 162, metric generator 154 can be configured to determine a number of interactions the second entity has with resources and content items associated with the second content providers. Based on the minor path data set(s) 174, metric generator 154 can be configured to determine the number of interactions of the first entity with the plurality of content providers. Metric generator 154 can be configure to compare the number of interactions of the first entity with the number of interactions of the second entity. The result of the comparison may be competitive metric 190.

In various implementations, metric generator 154 generates a first ratio. The first ratio may be the number of interactions of the first entity with the first content provider verse the number of interactions of the first entity with the second content providers. The first ratio may be based on minor path data set 174. Further, metric generator 154 can build a second ratio based on the number of interactions of the second entity (e.g., average number of interactions) with the first content provider verse the number of interactions of the second entity (e.g., average number of interactions) with the second content providers. The second ratio may be determined from minor path data set(s), interaction data elements 162 and interaction data elements 162. The interactions with the first and second content providers may refer to any link interaction, content item interaction, etc. Metric generator 154 can generate competitive metric 190 based on a comparison of the two ratios (i.e., a ratio of the first ratio and the second ratio).

Metric trending module 156 can be configured to trend competitive metric 190 over time. In some implementations, metric trending module 156 identifies competitive metrics associated with various time periods as competitive metric trend 196. By comparing the content campaign interaction trend 198 to the competitive metric trend 196, metric generator 154 can generate campaign influence metric(s) 192. By comparing the two trends, metric generator 154 can determine the effectiveness of the content campaign. In some implementations, metric generator 154 correlates the number of interactions with content campaigns to changes in the competitive metric. For example, if number of interactions of a user with the content campaign is above a predefined level and the competitive metric (i.e., competitive metric 190 for the user) is increasing, the content campaign may be effective. If the number of interactions of the user with the content campaign is above the predefined level and the competitive metric is decreasing, the content campaign may be ineffective. If the number of interactions of the user with the content campaign is below the predefined level, metric generator 154 may determine that there is not enough interaction data to determine the influence of the content campaign.

The level of influence may be a ratio. Metric generator 154 can generate the ratio by comparing the change in competitive metrics over a predefined amount of time to the number of interactions with content items of the content campaign. The influence for the content campaign determined by metric generator 154 can be stored in analysis database 160 as campaign influence metric 192. Campaign influence metric 192 can be used by content providers (i.e., content provider devices 106, content management system 108, etc.) to identify whether to make contact with the first entity in upper-funnel domains, lower-funnel domains, middle funnel domains, etc. Domain(s) 169 can be grouped based on the position in a user path funnel in which they most frequently appear. For example, a search engine may be considered an upper-funnel domain while a website on which users frequently perform conversions may be considered lower-funnel domains. In various implementations, metric generator 154 sends a notification to content provider devices 106 and/or content management system 108 indicating that contact should be made with a user in certain domains of the funnel based on competitive metric(s) 190 and/or campaign influence metric(s) 192. In various implementations, content management system 108 may adjust various parameters of a content campaign based on campaign influence metric(s) 192.

Figure 2:
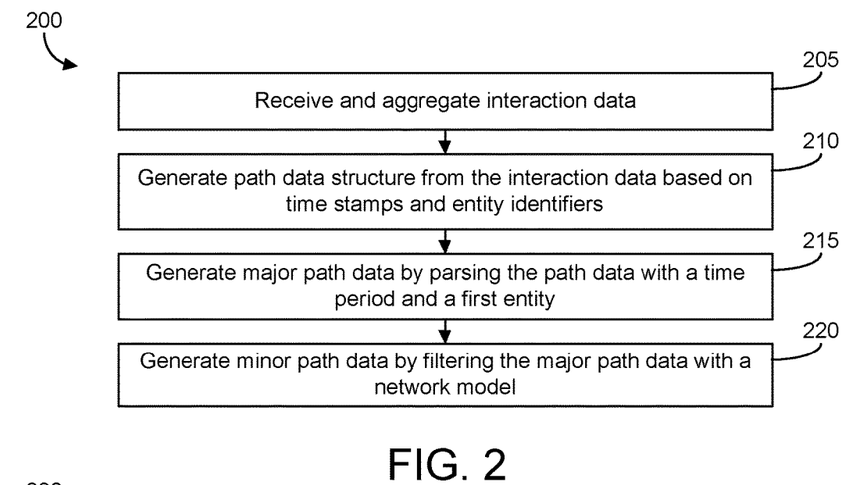
FIG. 2 is a flow diagram of a process for generating user path data structures with the analysis system of FIG. 1, according to an illustrative implementation.

FIG. 2 illustrates a flow diagram of a process 200 for generating path data, according to an illustrative implementation. Referring to both FIGS. 1 and 2, analysis system 150 may be configured to generate path data structure 170 based on interaction data elements 162. Interaction data elements 162 may be interactions with resources (e.g., a webpage, an application, a web search engine, links, etc.) associated with one or more domains 169 and/or interactions with resources and/or content items provided within the domains 169. In some implementations, each interaction of interaction data elements 162 is associated with a content provider as can be determined from content provider identifier(s) 164. The content items may include paid content items (e.g., paid items displayed within a search engine results interface and/or a different webpage, such as through the use of an auction process) and/or unpaid content items (e.g., unpaid search results displayed within a search engine results interface, unpaid links within a webpage, etc.).

Analysis system 150 can be configured to receive interaction data elements 162 from network 102 (205). The interaction data elements 162 may be generated by user devices 104. The interaction data elements 162 can be aggregated by analysis system 150 and stored in analysis database 160. In various implementations, analysis system 150 determines content provider identifier(s) 164 associated with the interactions, time stamp(s) 166 associated with the interactions, and entity identifier(s) 168 associated with each interactions. Content provider identifiers 164 can identify that a user has interacted with a resource and/or content item associated with a particular content provider. Time stamps 166 may indicate the time at which an interaction with the resource or content item has occurred. In various implementations, entity identifier(s) 168 indicate profiles, user devices, cookie identifiers, device identifiers, and/or any other information that is tied to one particular user. In this regard, path data structure 170 can be constructed for interactions across one or more devices all associated with a single user.

Path data structure 170 can be generated from the interaction data elements 162 (210). Path data structure 170 can identify a chain of interactions with various resources and/or content items of one or more users. Path constructor 152 can group content provider identifier(s) 164 by entity identifier(s) 168 so that all interactions with a resource and/or content provider of one user is grouped together.

Further, the groups of interactions associated with the users, can be sorted by time by path constructor 152 to create a path of interactions. The path of interactions indicate the sequence of interactions for one user based on time. In various implementations, path constructor 152 is configured to filter out various interaction data elements 162. In some implementations the interaction data elements filtered out are interactions with videos, interactions with display items, etc.

Path constructor 152 can generate the major path data set(s) 172 by parsing and sorting path data structure 170 (215). Path constructor 152, can sort path data structure 170 into groups of data paths based on a common entity. In various implementations, path constructor 152 uses an identifier (i.e., entity identifier(s) 168) to sort the data path(s) of path data structure 170 by entity identifier 168. The sorted data paths may be the basis for the major path data set(s) 172. The data path from among the sorted data paths can be parsed with a predefined time period. Based on time stamp(s) 166 of each interaction in the data path, path constructor 152 can parse (i.e., remove) interactions that have time stamps 166 outside the time period. In some implementations, content provider devices 106 selects the time period by sending a message via network 102 to analysis system 150.

Based on the major path data set(s) 172, path constructor 152 can generate minor path data set(s) 174 (220). Path constructor 152 can filter the major path data set(s) 172 with network model 180 to generate the minor path data set(s) 174. In various implementations, path constructor 152 can send the major path data set(s) 172 through network model 180 when network model 180 is a filter. Network model 180 can output the minor path data set(s) 174. Based on a select group of content providers and/or network model 180, certain interactions can be removed from the major path data set(s) 172. For example, one major path data set 172 may include interactions with content providers associated with sporting goods and content providers associated with automobiles. Path constructor 152 can use network model 180 to filter (i.e., remove) based on entity identifiers 168, all the interactions with the sporting goods content providers to create a minor path data set 174 that only includes interactions with automobile content providers.

Figure 3:
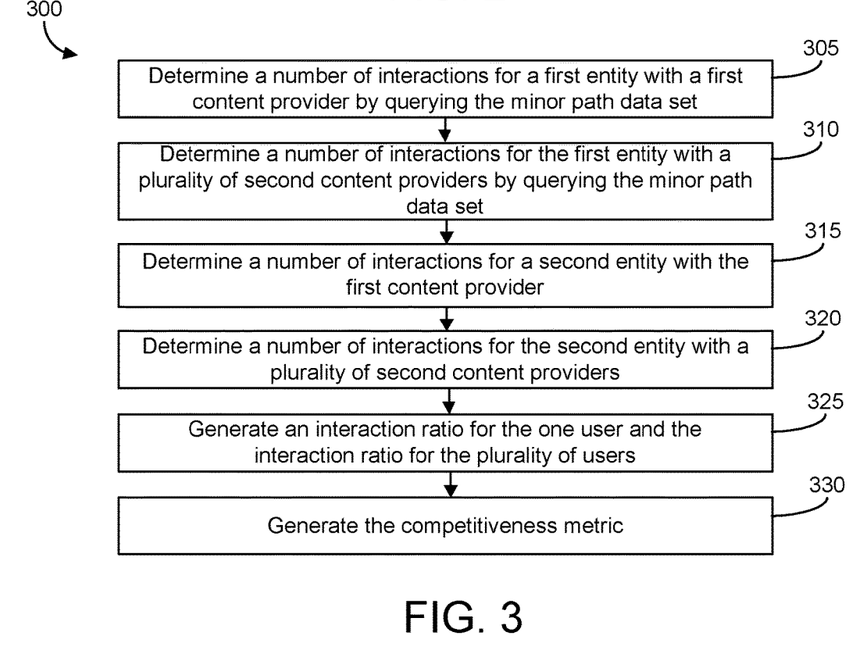
FIG. 3 is a flow diagram of a process for determining a competitive metric with the analysis system of FIG. 1, according to an illustrative implementation.

FIG. 3 illustrates a flow diagram of a process 300 for generating competitive metric 190, according to an illustrative implementation. Referring to both FIGS. 1 and 3, analysis system 150 may be configured to generate competitive metric 190 based on minor path data set(s) 174 and path data structure 170. In various implementations, analysis system 150 and/or content management system 108 are configured to perform some steps of process 300 and/or all steps of process 300. In some implementations, metric generator 154 is configured to perform some or all the steps of process 300.

Metric generator 154 can be configured to query minor path data set(s) 174 for the number of interactions the first entity has had with the first content provider (305). The first content provider may be the content provider that has requested competitive metric 190 be generated and the first entity may be the entity which the content provider has requested the metric be generated for. In some implementations, metric generator 154 is configured to query minor path data set(s) 174 for the number of interactions the first entity has had with the first content provider. Metric generator 154 can also be configured to query minor path data set(s) 174 for the number of interactions the first entity has had with a plurality of second content providers (310). In some implementations, the plurality of second content providers are all the content providers associated with resources and/or content items that the first entity has interacted with in the minor path data set 174 excluding interactions with one or more particular content providers (i.e., excluding the first content provider).

Metric generator 154 can be configured to query path data structure 170, minor path data set(s) 174, major path data set(s) 172, and/or interaction data elements 162 for the number of interactions the second entity has had with the first content provider (315). The second entity may be a user and/or group of users that may have entity identifier(s) 168. In various implementations, metric generator 154 identifies the total number of interactions with the second content provider that any user (i.e., the second entity) has had. In some implementations, metric generator 154 can identify the total number of interactions with the second content provider that a select group of users (i.e., the second entity) has had. The select group of users and/or parameters identifying the select group of users can be received from content provider devices 106 and/or content management system 108. The second entity can be users within a predefined age range, users within a predefined income range, users who have had a predefined number of conversions with the content provider, and/or any other parameter. In some implementations, content provider device 106 sets and/or requests the user parameters. Metric generator 154 can be configured to average the number of interactions with the first content provider that the second entity has had.

In some implementations, metric generator 154 can determine a number of interactions for the second entity with the second content providers (320) by querying path data structure 170. The second content providers may be content providers within a certain group or category as determined by network model 180. Metric generator 154 can be configured to average the number of interactions with the second content provider that all or some of the users of the second entity have had.

Metric generator 154 can be configured to generate interaction ratios (325). The interaction ratio may include a ratio for the first entity. The ratio for the first entity can be a ratio of the number of interactions the first entity has had with the first content provider to the number of interactions the first entity has had with the second content providers. This ratio may be referred to as the entity ratio or the first ratio herein. In some implementations, metric generator 154 can be configured to generate a ratio for the second entity. This ratio may be the number of interactions the second entity has had with the first content provider compared to the number of interactions the second entity has had with the second content providers. This ratio may be referred to as the group ratio or the second ratio.

Competitive metric 190 can be generated by metric generator 154 (330). In various implementations, metric generator 154 determines competitive metric 190 by comparing the number of interactions the first entity has had with the second content providers to the number of interactions the second entity has had with the second content providers. In some implementations, metric generator 154 determines competitive metric 190 by comparing the first ratio to the second ratio (i.e., a ratio of the first ratio and the second ratio).

Figure 4:
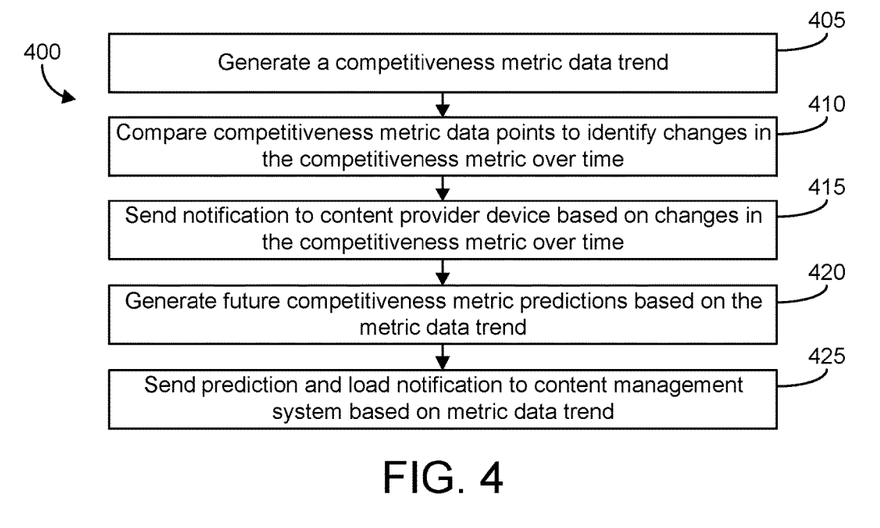
FIG. 4 is a flow diagram for identifying changes in a competitive metric over time with the analysis system of FIG. 1, according to an illustrative implementation.

FIG. 4 illustrates a flow diagram of a process 400 for monitoring competitive metrics 190 over time, according to an illustrative implementation. In some implementations, analysis system 150 can perform process 400. In various implementations, metric trending module 156 is configured to perform some steps of process 400 or all the steps of process 400. Metric trending module 156 can be configured to log competitive metrics 190 over time (405). In various implementations, each competitive metric 190 logged is associated with a unique time period. The trend of competitive metrics can be stored in metric trends 194. In various implementations, the trend of competitive metrics is stored in competitive metric trend(s) 196. Every time metric generator 154 generates a competitive metric 190, metric trending module 156 can be configured to update competitive metric trend(s) 196 with competitive metric 190 based on the time period associated with competitive metric 190.

Metric trending module 156 can be configured to identify any changes in competitive metric 190 based on competitive metric trend 196. In various implementations, metric trending module 156 compares two competitive metrics 190 of competitive metric trend 196 by taking a difference of the two (410). If the difference is greater than a predefined threshold, metric trending module 156 may generate a notification that competitive metric 190 has increased and/or decreased more than a predefined amount (415). In some implementations, the two competitive metrics 190 are the two most recent competitive metrics 190 that analysis system 150 (i.e., metric generator 154) has generated. The notification can be sent to content provider devices 106 and/or content management system 108. In some implementations, content management system 108 adjusts the quality score and/or adjusts bidding for a content campaign based on the change in competitive metric 190.

Based on competitive metric trend 196, metric trending module 156 can be configured to generate a metric prediction (420). In some implementations, various methods and processes are used to analyze the entire competitive metric trend 196 or a portion of competitive metric trend 196 to determine a metric prediction. The metric prediction may be a certain level for competitive metric 190 that is anticipated at one or more times in the future. In various implementations, metric trending module 156 uses an artificial neural network (ANN), a time series analysis, an exponential moving average (EMA) and/or any other method for determining a metric prediction based on the competitive metric trend 196.

Metric trending module 156 can be configured to send the metric predictions to content provider devices 106 (425). In some implementations, based on a plurality of metric predictions for a plurality of users, metric trending module 156 can send a server load metric to content provider devices 106 and/or content management system 108. In various implementations, content management system 108 can be configured to preprocess the necessary data to serve content items to user devices 104. A prediction of a competitive metric may indicate opportune times (i.e., when the competitive metric is above a predefined threshold) to serve a content item to user devices 104. When content management system 108 receives an indication of the opportune times in advance to their occurrence, content management system 108 can be configured to preprocess data, thus load balancing content management system 108. Further, content management system 108 can be configured to adjust a quality score and/or adjust bidding for a content campaign at one or more future times based on the prediction of competitive metric 190.

Figure 5:
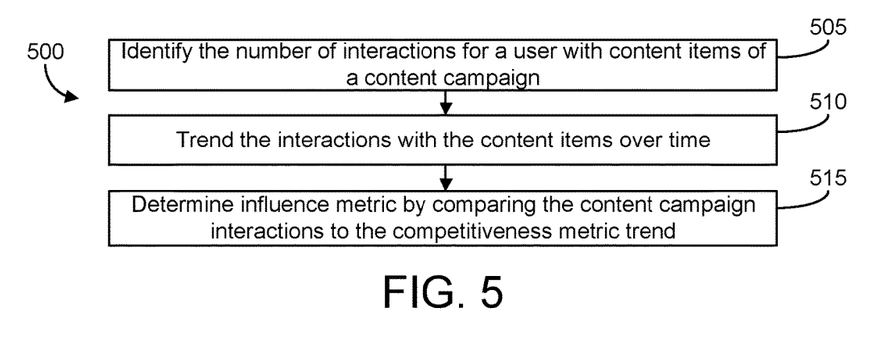
FIG. 5 is a flow diagram of a process for determining the influence of a content campaign with the analysis system of FIG. 1, according to an illustrative implementation.

FIG. 5 illustrates a flow diagram of a process 500 for determining the influence of a content campaign, according to an illustrative implementation. In some implementations, content management system 108, analysis system 150, and/or metric generator 154 can perform process 500. Metric generator 154 can be configured to analyze interaction data elements 162 to determine the number of interactions a user has with content items associated with a particular content campaign (505). In various implementations, metric trending module 156 can be configured to trend the number of interactions determined by metric generator 154 (510). The trend may be the number of interactions a user has with content items of a content campaign over time associated with the first content provider. In various implementations, the trend is generated periodically. In some implementations, each time a competitive metric 190 is generated that is associated with the first content provider, the number of interactions associated with the first content provider and/or the number of interactions with a content campaign of the first content provider is recorded for the predefined period of time used to generate the major data set 172 used to generate competitive metric 190. This may allow a direct correlation to be performed between the competitive metric 190 and various content campaigns of the first content provider. The trend of interactions with the first content provider and/or a content campaign of the first content provider may be stored as content campaign interaction trend(s) 196.

Metric generator 154 can be configured to compare the number of interactions with the content campaign to competitive metric trend(s) 196. Metric generator 154 can generate campaign influence metric 192 based on this comparison can be generated (515). In some implementations, campaign influence metric 192 is trended. In various implementations, campaign influence metric 192 is the influence that a certain campaign has at a certain time. Campaign influence metric 192 can be determined based on increases and decreases of competitive metric 190 over time compared to the number of interactions over the same period of time.

If the number of interactions with the content campaign is below a predefined threshold, there may not be enough interactions to determine campaign influence metric. If the number of interactions with the content campaign is above the predefined threshold, there may be enough interactions to determine campaign influence metric 192. If there is an increase in the competitive metric 190 and the number of interactions with the content campaign is above the predefined threshold, the content campaign may be considered influential and may be valued at the amount of increase in the competitive metric 190 and the number of interactions that have occurred with the content campaign. If there is a decrease in the competitive metric 190 and the number of interactions with the content campaign is above the predefined threshold, the content campaign may be considered ineffectual and may be valued at the amount of decrease and the number of interactions that have occurred with the content campaign. In some implementations, the campaign influence metric 192 is a ratio. The campaign influence metric 192 for an increase or decrease in competitive metric 190 may be the number of interactions with the content campaign divided by the increase in competitive metric 190 over a predefined time period. The predefined time may include the time periods used to generate the major sets for the two competitive metrics 190 from which the competitive increase or decrease is determined, plus the time between the two time periods.

Referring again to FIG. 1, analysis system 150 may be configured to group one or more of domains (i.e., domains 169) based on one or more characteristics. In one illustrative implementation, system 150 may categorize each domain within groups. For instance, system 150 may categorize domains as upper-funnel domains that appear more frequently in connection with assisting interactions than last interactions. System 150 may categorize domains that appear more frequently in connection with last interactions than assisting interactions as lower-funnel domains. System 150 may categorize domains with connection to last interactions as middle-funnel domains. In some implementations, system 150 may group the domains based on explicit or implicit groupings received from the content provider or another source.

In some implementations, system 150 may group domains 169 based on other characteristics. In some implementations, system 150 may group domains 169 at least in part based on an estimated cost of obtaining placements within domains 169. System 150 may be configured to determine a representative (e.g., average) price paid for placements within domains 169 (e.g., based on data received from content management system 108, such as from log files 114). System 150 may categorize domains 169 based in part on the representative price.

In some implementations, system 150 may group domains 169 based in part on industry categories or verticals associated with domains 169, such as automotive, consumer electronics, healthcare, etc. In some implementations, system 150 may group domains 169 based on one or more characteristics or dimensions defined by one or more content providers. In one such implementation, system 150 may group domains 169 according to a customer lifetime value (CLV) metric defined by one or more content providers. If enough content providers upload CLV data to provide an adequate sample, the CLV data may be used as selection criteria to categorize domains 169 based on CLV performance. System 150 may be configured to receive confirmation from content providers that they wish to share their defined dimension data with other content providers prior to using the data to categorize domains 169 for other content providers.

Figure 6:
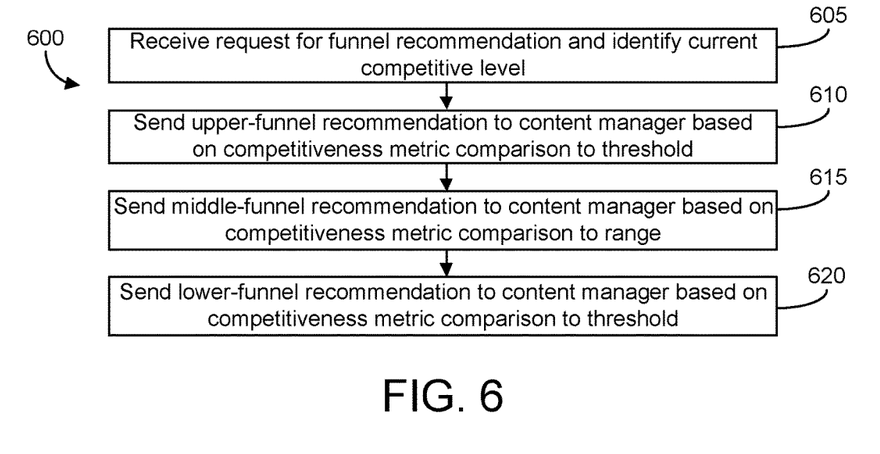
FIG. 6 is a flow diagram of a process for determining funnel position recommendations with the analysis system of FIG. 1, according to an illustrative implementation.

Referring now to FIG. 6, a process 600 for determining a funnel position recommendation for a content item or content campaign is shown, according to an illustrative implementation. In some implementations, analysis system 150 and/or metric generator 154 can perform some of the steps or all of the steps of process 600. Analysis system 150 can be configured to receive a funnel position request from content provider devices 106 and/or content management system 108 (605). In some implementations, the request may be for a specific entity (i.e., the first entity) and may indicate a specific content provider. Based on the request, analysis system 150 can be configured to generate a new competitive metric 190. In some implementations, if the competitive metric 190 has been recently generated for the specific entity and/or the request is time critical, analysis system 150 may utilize the most recent competitive metric 190. Further, analysis system 150 may generate funnel position recommendations based on competitive metric 190. In various implementations, the funnel position recommendation is based on a plurality of factors. These factors can be used alone or in combination with competitive metric 190 in determining content item and funnel position recommendations. These factors may be a budget associated with a content campaign, a conversion price range associated with a user (e.g., a price range for a product that the user is considering), and/or any other factor. For instance, a shoe vendor with a fixed budget may consider the average category price that the user is searching for and elect to invest to a greater degree in those categories that would offer a better opportunity for limited resources.

The funnel position recommendation may be an upper-funnel recommendation, a middle-funnel recommendation, and a lower-funnel recommendation. The recommendations may cause and/or recommend a content management system (e.g., content management system 108) and/or a content provider (e.g., content provider devices 106) to increase spending regarding content items, search keywords, etc. In various implementations, the recommendation may include a recommendation for a certain type of content item and/or increased spending on a certain keyword applicable for a certain level of competitive metric 190 and/or on certain domains (i.e., upper-funnel domains, middle-funnel domains, lower-funnel domains). The recommendations may also be upper keyword recommendations, middle keyword recommendations, lower keyword recommendations, upper content item recommendations, middle content item recommendations, and lower content item recommendations. These keyword and content item recommendations may indicate appropriate keywords to increase spending on and/or certain content items to utilize (i.e., by a content management system) based on the level of competitive metric 190. In various implementations, an upper-funnel recommendation (e.g., upper keyword, upper content item) may include keyword and content item investment (i.e., spending) above a predefined amount. A lower-funnel recommendation (e.g., lower keyword, lower content item) may include keyword and content item investment below a predefined amount. A middle-funnel recommendation (e.g., middle keyword recommendation, middle content item recommendation) may include keyword and content item investment within a predefined amount.

Figure 7:
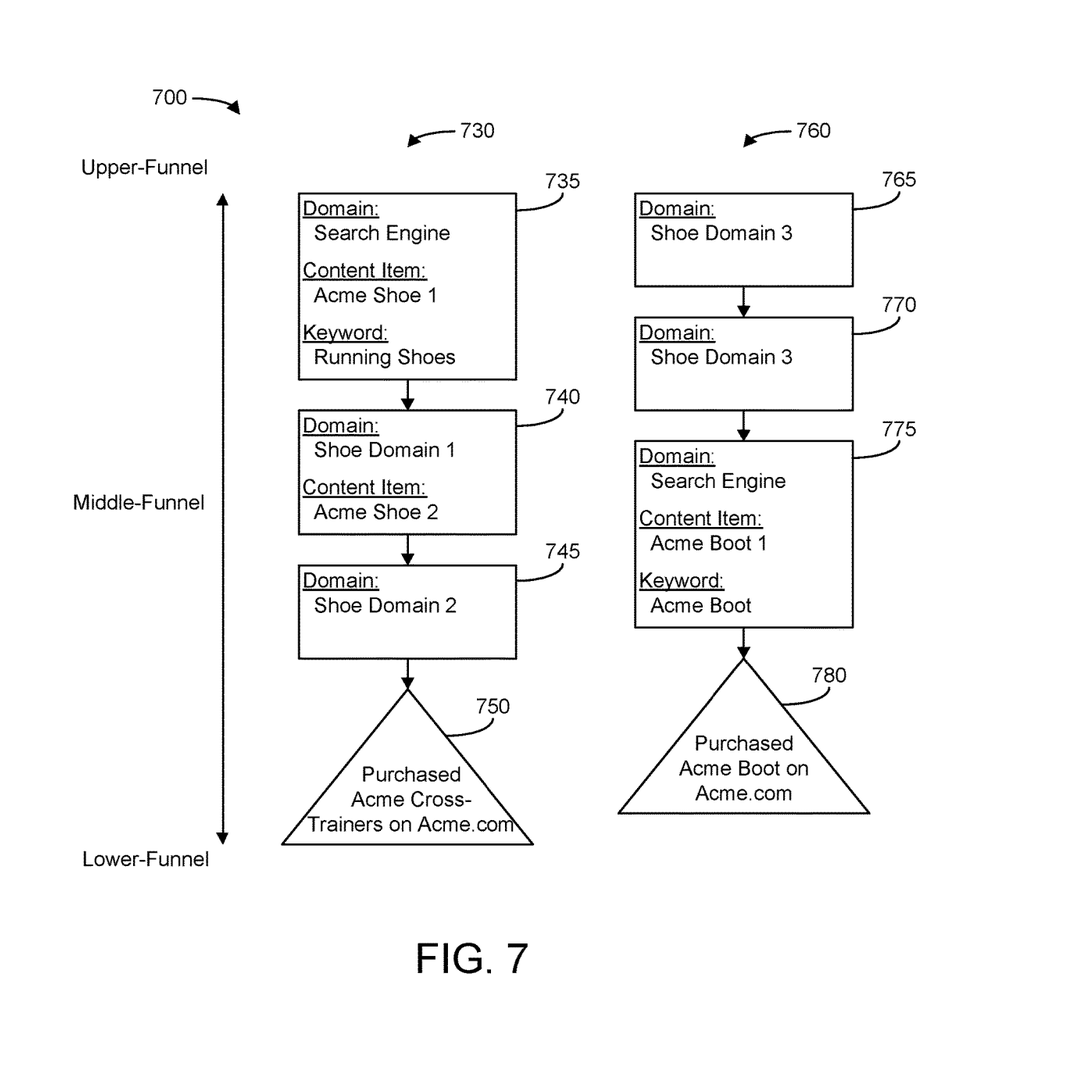
FIG. 7 is a visual representation of path data according to an illustrative implementation.

As described further with reference to FIGS. 1, 6, and 7, the funnel may indicate various domains in a user path. The domains may be upper-funnel domains. These domains may be the first interactions in a user path (e.g., a search engine). Further, the domains can be middle-funnel. These domains may be domains which are in the middle of a user path. The domains in the middle of the user path may be those domains that a user navigates to after clicking on a search result or are located immediately before the lower-funnel domains in the path data. Finally, the domains can be lower-funnel. The lower-funnel domains may be domains that a user interacts with immediately or shortly before the user performs a conversion (i.e., purchase). The domains categorized in the funnel positions may be an absolute categorization. For example, a search engine or other website may always be considered an upper-funnel domain. In various implementations, the funnel positions are relative to a content provider. The domain categorization can match the investment actions of a content provider. In this regard, the content provider may be associated with a funnel that is the result of investments (e.g., advertisement placement) or otherwise the focus which a content provider places on various domains. In this regard, upper-funnel domains for one content provider may be different than upper-funnel domains for a different content provider. In one such example, a coupon site that focuses on bottom of the funnel conversions may have a smaller funnel as compared to a content-oriented site (e.g., what is considered "upper-funnel" for the coupon site may be a different position within a timeline of customer activity than for the content-oriented site).

If competitive metric 190 is above a predefined threshold, this may indicate that the user is highly competitive and content management system 108 should make contact with the user in the upper-funnel (610). Analysis system 150 can be configured to send an upper-funnel recommendation to content provider devices 106 and/or content management system 108 in response to determining that the user is highly competitive. In various implementations, the recommendation may adjust a quality score for a content campaign associated with competitive metric 190. This recommendation may increase and/or recommend an increase in bidding for content placement on upper-funnel domains. The quality score may be increased by a predefined amount based on the value of competitive metric 190. In some implementations, analysis system 150 generates an upper keyword recommendation and/or an upper content item recommendation for the content management system 108 and/or content provider devices 106 when the competitive metric 190 is above the predefined threshold.

If the competitive metric 190 lies within a predefined range, the analysis system 150 may be configured to send a middle-funnel recommendation to content provider devices 106 and/or content management system 108 (615). If the competitive metric 190 is within a predefined range, this may indicate that the user is currently narrowing down his or her purchase options. If the entity is narrowing down its purchase options, middle-funnel domains may be the appropriate recommendation. The recommendation may include a message to increase a quality score for middle-funnel domains for a content campaign associated with the competitive metric 190. Further, the bidding may be increased and/or decreased by a certain amount based on an appropriate bidding amount for an entity who's competitive metric 190 lies within the predefined range. In some implementations, analysis system 150 generates a middle keyword recommendation and/or a middle content item recommendation for the content management system 108 and/or content provider devices 106 when the competitive metric 190 within the predefined range.

If the competitive metric is below a predefined threshold, the analysis system 150 may be configured to send a lower-funnel recommendation to content provider devices 106 and/or content management system 108 (620). When the competitive metric 190 is below a predefined threshold this may indicate that the user is brand loyal to a content provider. When a user is brand loyal, the content provider may not need to make contact with the entity frequently in the upper-funnel and/or the middle-funnel. A quality metric for a content campaign associated with competitive metric 190 may be changed to make contact with an entity in lower-funnel domains. Further, the appropriate bidding amount can be increased or decreased to an amount appropriate for the content campaign associated with a competitive metric 190 below the predefined threshold. In some implementations, analysis system 150 generates a lower keyword recommendation and/or a lower content item recommendation for the content management system 108 and/or content provider devices 106 when the competitive metric 190 is below the predefined threshold.

Referring now to FIG. 7, a visual representation of major path data set 172 is shown according to an illustrative implementation. In the illustrated implementation, major path data set 172 includes a first conversion path 730 including several interactions (i.e., interactions with resources and/or content items). In a first interaction 735, the user enters the query "Running Shoes" in a search engine search interface, and is presented with a paid content item "Acme Shoe 1" within a results interface. The user clicks the "Acme Shoe 1" item, and is directed to a webpage within a domain "Shoe Domain 1" (e.g., www.shoedomain1.com) (second interaction 740). Another content item, "Acme Shoe 2," is displayed within the webpage, and the user clicks this item and is directed to another interaction 745 with a webpage in a domain "Shoe Domain 2." Interaction 745 leads to a purchase of an "Acme Cross-Trainers" product on the Acme Shoe Company website (converting action 750).

Another conversion path 760 includes a first interaction 765 in which the user navigates to a webpage within a domain "Shoe Domain 3." The user again interacts with a webpage in "Shoe Domain 3" (e.g., the same page or a different page) in a second interaction 770. Subsequent to interaction 770, the user navigates to a search engine search interface and submits the query "Acme Boot," in response to which the user is presented with a content item "Acme Boot 1" within a results interface of the search engine (interaction 775). The user clicks through the content item, navigating to the Acme Shoe Company website, and purchases an "Acme Boot" product (converting action 780).

Figure 8:
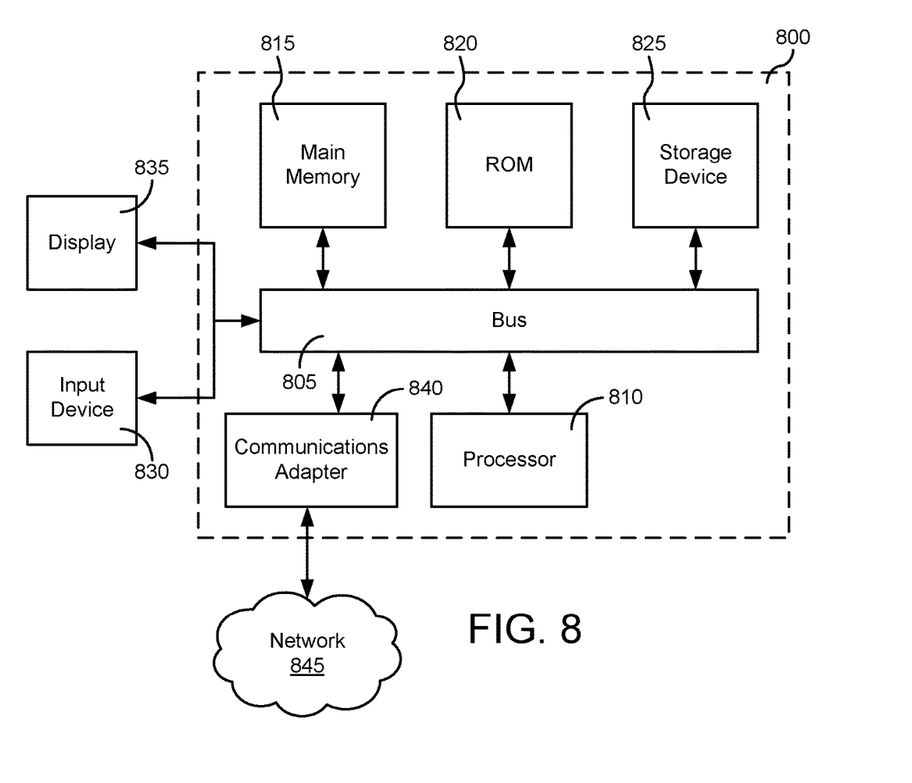
FIG. 8 is a block diagram of a computing system according to an illustrative implementation.

FIG. 8 illustrates a depiction of a computer system 800 that can be used, for example, to implement an illustrative user device 104, an illustrative content management system 108, an illustrative content provider device 106, an illustrative analysis system 150, and/or various other illustrative systems described in the present disclosure. The computing system 800 includes a bus 805 or other communication component for communicating information and a processor 810 coupled to the bus 805 for processing information. The computing system 800 also includes main memory 815, such as a random access memory (RAM) or other dynamic storage device, coupled to the bus 805 for storing information, and instructions to be executed by the processor 810. Main memory 815 can also be used for storing position information, temporary variables, or other intermediate information during execution of instructions by the processor 810. The computing system 800 may further include a read only memory (ROM) 810 or other static storage device coupled to the bus 805 for storing static information and instructions for the processor 810. A storage device 825, such as a solid state device, magnetic disk or optical disk, is coupled to the bus 805 for persistently storing information and instructions.

The computing system 800 may be coupled via the bus 805 to a display 835, such as a liquid crystal display, or active matrix display, for displaying information to a user. An input device 830, such as a keyboard including alphanumeric and other keys, may be coupled to the bus 805 for communicating information, and command selections to the processor 810. In another implementation, the input device 830 has a touch screen display 835. The input device 830 can include a cursor control, such as a mouse, a trackball, or cursor direction keys, for communicating direction information and command selections to the processor 810 and for controlling cursor movement on the display 835.

In some implementations, the computing system 800 may include a communications adapter 840, such as a networking adapter. Communications adapter 840 may be coupled to bus 805 and may be configured to enable communications with a computing or communications network 845 and/or other computing systems. In various illustrative implementations, any type of networking configuration may be achieved using communications adapter 840, such as wired (e.g., via Ethernet), wireless (e.g., via WiFi, Bluetooth, etc.), pre-configured, ad-hoc, LAN, WAN, etc.

According to various implementations, the processes that effectuate illustrative implementations that are described herein can be achieved by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes described herein. One or more processors in a multi-processing arrangement may also be employed to execute the instructions contained in main memory 815. In alternative implementations, hard-wired circuitry may be used in place of or in combination with software instructions to implement illustrative implementations. Thus, implementations are not limited to any specific combination of hardware circuitry and software.

Although an example processing system has been described in FIG. 8, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-readable storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
  receiving, at a computerized analysis system, a plurality of interaction data elements, each of the plurality of interaction data elements associated with a resource of a content provider and comprising an identifier and a time stamp;
  generating, at the computerized analysis system, a path data structure comprising a plurality of paths, each of the paths representing a series of interactions, the path data structure generated by:
    correlating identifiers of the plurality of interaction data elements to determine a set of interaction data elements corresponding to a particular entity identified by the identifier; and
    generating the path data structure by linking the interaction data elements of the set according to time based on the associated time stamps;
  generating a minor path data set by:
    parsing, at the computerized analysis system, the path data structure to generate a major path data set comprising paths having interaction data elements associated with time stamps within a predefined period of time and identifiers associated with a first entity; and filtering, at the computerized analysis system, the major path data set to generate the minor path data set based on a network model and content providers associated with the resources; and determining, at the computerized analysis system, a competitive metric for the minor path data set to be provided to a first content provider by:

querying the minor path data set to determine a first number of interaction data elements identifying the first entity and the resources associated with a plurality of second content providers different from the first content provider;

determining, from the path data structure, a second number of interaction data elements identifying an entity other than the first entity and the resources associated with the second content providers; and determining the competitive metric based on a comparison of the first number of interaction data elements with the second number of interaction data elements.

2. The method of claim 1, further comprising:
generating a first ratio by:
querying the minor path data set to determine a third number of interaction data elements identifying the first entity and resources associated with the first content provider; and
comparing the third number of interaction data elements with the first number of interaction data elements to generate the first ratio;
generating a second ratio by:
determining, from the path data structure, a fourth number of interaction data elements identifying the entity other than the first entity and the resources associated with the first content provider; and
comparing the fourth number of interaction data elements with the second number of interaction data elements to determine the second ratio; and
determining the competitive metric based on a comparison of the second ratio and the first ratio.

3. The method of claim 1, wherein generating the path data structure further comprises filtering the set of interaction data elements to exclude interaction data elements comprising videos.

4. The method of claim 1, wherein the network model comprises at least one of:
an industry vertical that categorizes the content providers into groups based on content provider tags; and
a competitor model that identifies the plurality of content providers that are competitors.

5. The method of claim 1, further comprising receiving, at the computerized analysis system, the content providers that are competitors; and
setting the competitor model to the content providers that are competitors.

6. The method of claim 1, further comprising receiving, at the computerized analysis system, a lookback time period; and
setting the predefined period of time to the lookback time period.

7. The of claim 1, further comprising:
determining, at the computerized analysis system, a second competitive metric for a second time period other than the predefined period of time, the second competitive metric associated with the first entity;

determining a difference between the competitive metric and the second competitive metric; and
transmitting a notification to a content provider device when the difference is greater than a predefined amount.

8. The method of claim 7, further comprising:
querying, by the analysis system, the path data structure for the number of interactions the first entity has had with a content campaign inside and between the predefined period of time and the second time period;
determining that the number of interactions with the content campaign is above a predefined threshold;
generating a campaign influence metric by comparing the difference between the competitive metric and the second competitive metric with the number of interactions with the content campaign in response to the determination that the number of interactions is above the predefined threshold.

9. The method of claim 1, further comprising:
sending, by the computerized analysis system, an upper-funnel recommendation to a content manager system when the competitive metric is above a predefined threshold, the upper-funnel recommendation comprising a recommendation to increase investment in content items to be presented in domains identified as upper-funnel domains; and
sending, by the computerized analysis system, a lower-funnel recommendation to the content manager system when the competitive metric is below the predefined threshold, the lower-funnel recommendation comprising a recommendation to increase investment in content items to be presented in domains identified as lower-funnel domains.

10. A system comprising:
at least one computing device operably coupled to at least one memory and configured to:
receive a plurality of interaction data elements, each of the plurality of interaction data elements associated with a resource of a content provider and comprising an identifier and a time stamp;
generate a path data structure comprising a plurality of paths by correlating identifiers of the plurality of interaction data elements and linking the correlated interaction data elements according to time based on the associated time stamps;
generate a minor path data set by:
parsing the path data structure to generate a major path data set comprising the paths having interaction data elements associated with time stamps within a predefined period of time and identifiers associated with a first entity; and
filtering the major path data set to generate the minor path data set based on a network model and content providers associated with the resources; and
determining a competitive metric for the minor path data set to be provided to a first content provider by:
query the minor path data set to determine a first number of interaction data elements identifying the first entity and the resources associated with a plurality of second content providers different from the first content provider;
determine, from the path data structure, a second number of interaction data elements identifying an entity other than the first entity and the resources associated with the second content providers; and determine the competitive metric based on a comparison of the first number of interaction data elements with the second number of interaction data elements.

11. The system of claim 10, wherein the at least one computing device is configured to generate the path data structure by filtering the set of interaction data elements to exclude interaction data elements comprising videos.

12. The system of claim 10, wherein the network model comprises at least one of:
an industry vertical that categorizes the content providers into groups based on content provider tags; and
a competitor model that identifies the plurality of content providers that are competitors.

13. The system of claim 12, wherein the at least one computing device is configured to:
receive the content providers that are competitors; and
set the competitor model to the content providers that are competitors.

14. The system of claim 10, wherein the at least one computing device is configured to:
receive a lookback time period and set the predefined period of time to the lookback time period.

15. The system of claim 10, wherein the at least one computing device is configured to:
generate a first ratio by:
querying the minor path data set to determine a third number of interaction data elements identifying the first entity and resources associated with the first content provider; and
comparing the third number of interaction data elements with the first number of interaction data elements to generate the first ratio;
generate a second ratio by:
determine, from the path data structure, a fourth number of interaction data elements identifying the entity other than the first entity and the resources associated with the first content provider; and
comparing the fourth number of interaction data elements with the second number of interaction data elements to determine the second ratio; and
determining the competitive metric based on a comparison of the second ratio and the first ratio.

16. The system of claim 10, wherein the at least one computing device is configured to:
determine a second competitive metric for a second time period other than the predefined period of time, the second competitive metric associated with the first entity;
determine a difference between the competitive metric and the second competitive metric; and
transmit a notification to a content provider device when the difference is greater than a predefined amount.

17. The system of claim 16, wherein the at least one computing device is configured to:
query the path data structure for the number of interactions the first entity has had with a content campaign inside and between the predefined period of time and the second time period;
determine that the number of interactions with the content campaign is above a predefined threshold;
generate a campaign influence metric by comparing the difference between the competitive metric and the second competitive metric with the number of interactions with the content campaign in response to the determination that the number of interactions is above the predefined threshold.

18. The system of claim 10, wherein the at least one computing device is configured to:
send an upper-funnel recommendation to a content manager system when the competitive metric is above a predefined threshold, the upper-funnel recommendation comprising a recommendation to increase investment in content items to be presented in domains identified as upper-funnel domains; and
send a lower-funnel recommendation to the content manager system when the competitive metric is below the predefined threshold, the lower-funnel recommendation comprising a recommendation to increase investment in content items to be presented in domains identified as lower-funnel domains.

19. One or more non-transitory computer-readable storage media having instructions stored thereon that, when executed by at least one processor, cause the at least one processor to perform operations comprising:
receiving a plurality of interaction data elements, each of the plurality of interaction data elements associated with a resource of a content provider and comprising an identifier and a time stamp;
generating a path data structure comprising a plurality of paths by correlating identifiers of the plurality of interaction data elements and linking the correlated interaction data elements according to time based on the associated time stamps;
generating a minor path data set by:
parsing the path data structure to generate a major path data set comprising the paths having interaction data elements associated with time stamps within a predefined period of time and identifiers associated with a first entity; and
filtering the major path data set to generate the minor path data set based on a network model and content providers associated with the resources; and
determining a competitive metric for the minor path data set to be provided to a first content provider by:
querying the minor path data set to determine a first number of interaction data elements identifying the first entity and the resources associated with a plurality of second content providers different from the first content provider;
determining, from the paths, a second number of interaction data elements identifying an entity other than the first entity and the resources associated with the second content providers; and
querying the minor path data set to determine a third number of interaction data elements identifying the first entity and resources associated with the first content provider;
comparing the third number of interaction data elements with the first number of interaction data elements to generate a first ratio;
determining, from the path data structure, a fourth number of interaction data elements identifying the entity other than the first entity and the resources associated with the first content provider;
comparing the fourth number of interaction data elements with the second number of interaction data elements to determine a second ratio; and
determining the competitive metric based on a comparison of the second ratio and the first ratio.

20. The one or more non-transitory computer-readable storage media of claim 19, wherein the network model comprises at least one of:

an industry vertical that categorizes the content providers into groups based on content provider tags; and a competitor model that identifies the plurality of content providers that are competitors.

\* \* \* \* \*